(12) United States Patent
Lun

(10) Patent No.: US 11,592,075 B2
(45) Date of Patent: Feb. 28, 2023

(54) MINI-MAGNETO RHEOLOGICAL DAMPER

(71) Applicant: BeijingWest Industries Co., Ltd., Beijing (CN)

(72) Inventor: Saiman Lun, Centerville, OH (US)

(73) Assignee: BEIJINGWEST INDUSTRIES CO., LTD., Beijing (CN)

(*) Notice: Subject to any disclaimer, the term of this patent is extended or adjusted under 35 U.S.C. 154(b) by 141 days.

(21) Appl. No.: 16/930,255

(22) Filed: Jul. 15, 2020

(65) Prior Publication Data

US 2021/0018061 A1   Jan. 21, 2021

Related U.S. Application Data

(60) Provisional application No. 62/874,947, filed on Jul. 16, 2019.

(30) Foreign Application Priority Data

Jul. 3, 2020   (CN) .......................... 202010630265.5

(51) Int. Cl.
*F16F 9/53* (2006.01)
*F16F 9/32* (2006.01)
(Continued)

(52) U.S. Cl.
CPC .............. *F16F 9/537* (2013.01); *F16F 9/068* (2013.01); *F16F 9/3242* (2013.01); *F16F 9/369* (2013.01); *F16F 9/43* (2013.01); *F16F 2224/045* (2013.01)

(58) Field of Classification Search
CPC .......... F16F 9/537; F16F 9/068; F16F 9/3242; F16F 9/369; F16F 9/43; F16F 2224/045
See application file for complete search history.

(56) References Cited

U.S. PATENT DOCUMENTS 5,725,226 A * 3/1998 Cabrerizo-Pariente ....................
B62K 25/08
188/300
7,364,022 B2   4/2008 Gordaninejad et al.
(Continued)

FOREIGN PATENT DOCUMENTS

CN   202048132 U    11/2011
CN   104315071 A *   1/2015
(Continued)

OTHER PUBLICATIONS

Extended European Search Report dated Dec. 15, 2020 for counterpart European patent application No. 20185906.3.
(Continued)

*Primary Examiner* — Melody M Burch
(74) *Attorney, Agent, or Firm* — William H. Honaker; Dickinson Wright PLLC

(57) ABSTRACT

A magneto rheological damper includes a housing extending between a first opened end and a second opened end and defining a fluid chamber extending therebetween. An end cap is located at the first opened end and coupled to the housing. A piston is disposed in the fluid chamber dividing the fluid chamber into a compression chamber and a rebound chamber. A piston rod extends along the center axis and attaches to the piston for movement with the piston between a compression and a rebound stroke. A magnetic field generator is located in the compression chamber and in an abutment relationship with the end cap. An extension portion protrudes radially outwardly from the housing and defining a compensation chamber and a channel. The channel is in fluid communication with the compression chamber and the compensation chamber for allowing the working fluid to flow from the compression chamber to the compensation chamber.

15 Claims, 3 Drawing Sheets

(51) Int. Cl.
*F16F 9/06* (2006.01)
*F16F 9/36* (2006.01)
*F16F 9/43* (2006.01)

(56) References Cited

U.S. PATENT DOCUMENTS

| | | |
|---|---|---|
| 8,770,357 B2 | 7/2014 | Sims et al. |
| 8,800,730 B2 | 8/2014 | Battlogg et al. |
| 8,910,963 B2 | 12/2014 | Battlogg et al. |
| 8,967,343 B2 | 3/2015 | Battlogg et al. |
| 10,099,743 B2 | 10/2018 | Walthert et al. |
| 2002/0008601 A1* | 1/2002 | Yajima ............... H01F 7/081 335/220 |
| 2009/0084646 A1* | 4/2009 | Browne ............... F16F 9/537 188/267.2 |
| 2012/0292143 A1* | 11/2012 | Anderfaas ........... F16F 9/537 188/267.2 |
| 2013/0207327 A1 | 8/2013 | Besliu |
| 2016/0339990 A1 | 11/2016 | Walthert et al. |
| 2017/0015172 A1 | 1/2017 | Marble et al. |

FOREIGN PATENT DOCUMENTS

| | | | |
|---|---|---|---|
| CN | 10474649 A | * | 7/2015 |
| CN | 107314077 A | | 11/2017 |
| CN | 108275039 A | * | 7/2018 |
| EP | 1394439 A1 | | 3/2004 |
| JP | 5371196 U | | 6/1978 |
| KR | 20090131479 A | * | 12/2009 |

OTHER PUBLICATIONS

First Office Action and search report dated Jul. 28, 2021 for counterpart Chinese patent application No. 202010630265.5, along with EN translation.

Second Office Action dated Jan. 29, 2022 for counterpart Chinese patent application No. 202010630265.5, along with machine EN translation downloaded from EPO.

\* cited by examiner

MINI-MAGNETO RHEOLOGICAL DAMPER

CROSS-REFERENCE TO RELATED APPLICATIONS

This application claims the benefit of U.S. Provisional Application Patent Ser. No. 62/874,947, filed on Jul. 16, 2019, and CN Application No. 202010630265.5 filed on Jul. 3, 2020. The entire disclosures of which are hereby incorporated herein by reference in their entirety.

BACKGROUND OF THE INVENTION

1. Field of the Invention

The present invention generally relates to a magneto rheological damper.

2. Description of the Prior Art

Shock absorption has a major influence on the riding characteristics and therefore it constitutes a significant feature of bicycles and, in particular, sports bicycles such as mountain bikes. Thus, shock absorbers allow improved ground contact and enable a sporty riding style even in extremely rough terrain remote from streets or paved paths. Typically, shock-absorbing bicycles comprise a suspension fork which tends to be supplemented by a rear wheel damper. Such a shock absorber usually comprises a spring unit for springing any shocks and a damping unit for damping the spring vibration.

For optimal utilization of the benefits of shock absorption, setting the damping and spring characteristics is indispensable. Criteria for setting the damping and spring characteristics include the rider's weight and riding style, and the characteristics of the terrain. To set the damping and spring characteristics, it requires adjusting the shock absorbers including setting and coordinating a number of parameters for damping and springing. These adjustments are not without problems though, in particular for beginners. A combination of less than optimal settings may, in extreme cases, deteriorate the riding characteristics.

One such a damper is disclosed in U.S. Patent Application US2016/0339990. The damper includes a housing extending along a center axis between a first opened end and a second opened end and defining a fluid chamber extending therebetween for containing a working fluid. An end cap is disposed at the first opened end and attached to the housing for closing the first opened end. A piston is slidably disposed in the fluid chamber dividing the fluid chamber into a compression chamber and a rebound chamber. The compression chamber extends between the end cap and the piston. The rebound chamber extends between the piston and the second opened end. A piston rod extends along the center axis, into the rebound chamber between a proximate end and a distal end. The proximate end is located outside the housing. The distal end attaches to the piston for movement between a compression stroke and a rebound stroke.

SUMMARY OF THE INVENTION

The present invention provides a magneto rheological damper having a shortened damper length and a compact design. The present invention also provides a magneto rheological damper that is easy to assemble. In addition, the present invention provides a magneto rheological damper that can be produced at a low cost.

It is one aspect of the present invention to provide a magneto rheological damper. The magneto rheological damper includes a housing extending along a center axis between a first opened end and a second opened end and defining a fluid chamber extending therebetween for containing a working fluid. An end cap is located at the first opened end and couples to the housing for closing the first opened end. A piston is slidably disposed in the fluid chamber dividing the fluid chamber into a compression chamber and a rebound chamber. The compression chamber extends between the end cap and the piston. The rebound chamber extends between the piston and the second opened end. A piston rod extends along the center axis into the rebound chamber between a proximate end and a distal end. The proximate end is located outside the housing. The distal end attaches to the piston for movement between a compression stroke and a rebound stroke. A magnetic field generator is located in the compression chamber and in an abutment relationship with the end cap for generating a magnetic field to change the viscosity of the working fluid. An extension portion protrudes radially outwardly from the housing and defining a compensation chamber and a channel with the channel being in fluid communication with the compression chamber and the compensation chamber for allowing the working fluid to flow from the compression chamber to the compensation chamber.

It is another aspect of the present invention to provide a magneto rheological damper. The magneto rheological damper includes a housing extending along a center axis between a first opened end and a second opened end and defining a fluid chamber extending therebetween for containing a working fluid. An end cap is located at the first opened end and couples to the housing for closing the first opened end. A piston is slidably disposed in the fluid chamber dividing the fluid chamber into a compression chamber and a rebound chamber. The compression chamber extends between the end cap and the piston. The rebound chamber extends between the piston and the second opened end. A piston rod extends along the center axis into the rebound chamber between a proximate end and a distal end. The proximate end is located outside the housing. The distal end couples to the piston for movement between a compression stroke and a rebound stroke. A magnetic field generator is located in the compression chamber and in an abutment relationship with the end cap for generating a magnetic field to change the viscosity of the working fluid. A coil spring is located in the compression chamber and extending helically along the center axis between the piston and the end cap to support a rider's weight and to maintain a proper ride height. The end cap and the magnetic field generator defines a bore extending along the center axis to receive one end of the coil spring.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
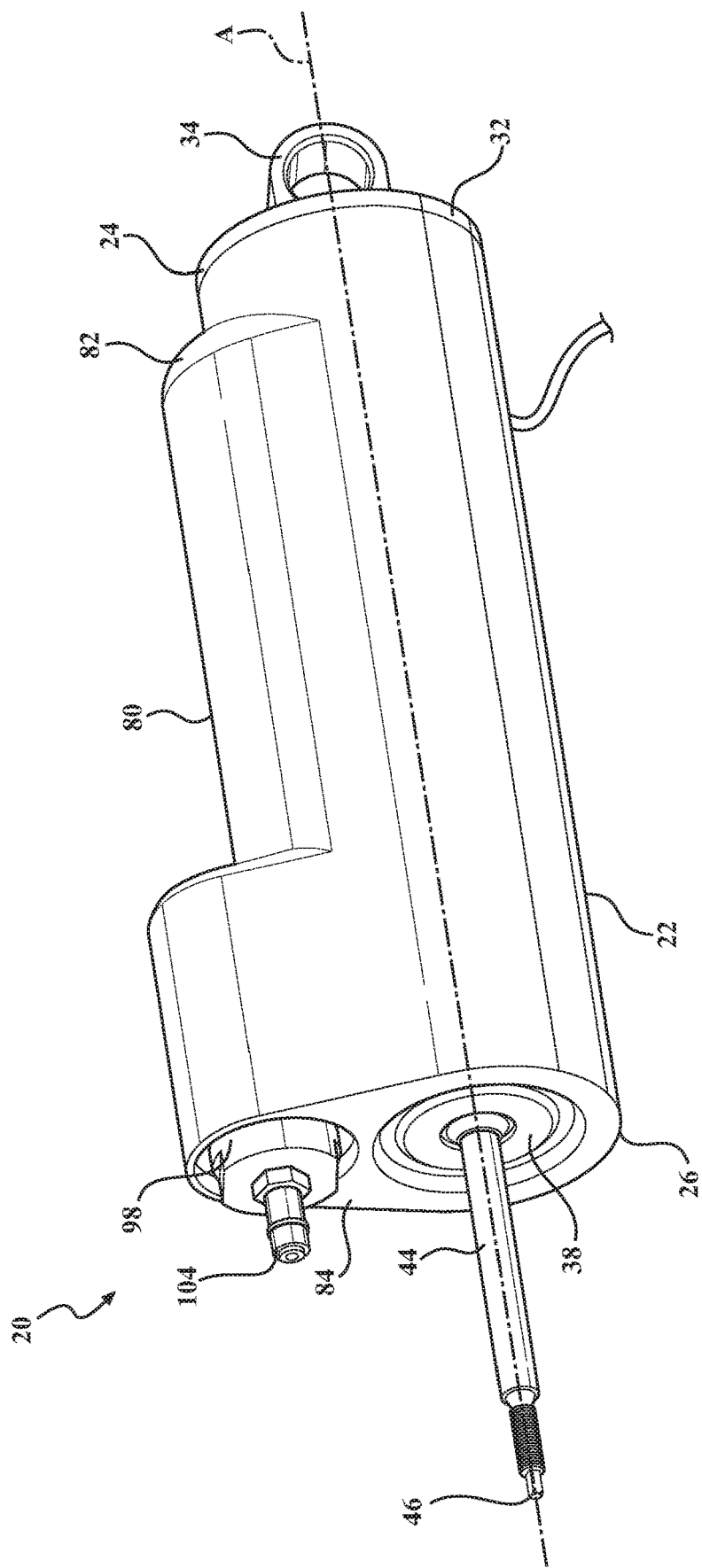
FIG. 1 is a perspective view of a magneto rheological damper constructed in accordance with an embodiment of the present invention.

Referring to the Figures, wherein like numerals indicate corresponding parts throughout the several views, a magneto rheological damper 20 constructed in accordance with one embodiment of the present invention is generally shown in FIG. 1. It should be appreciated that the magneto rheological damper 20 according to the present invention can be used in a mountain bike or an electric scooter.

As best shown in FIG. 1, the magneto rheological damper 20 includes a housing 22, having a generally cylindrical shape, disposed on a center axis A and extending about the center axis A between a first opened end 24 and a second opened end 26. The housing 22 defines a fluid chamber 28, 30 extending between the first opened end 24 and the second opened end 26 for containing a working fluid. An end cap 32, located at the first opened end 24 of the housing 22, couples to the housing 22 for closing the first opened end 24. A mounting ring 34 couples to the end cap 32 for connecting the housing 22 to the mountain bike or the electric scooter. Typically, the working fluid may be any hydraulic fluids known in the art. According to an embodiment of the present invention, the working fluid used in the present invention can be a magneto rheological fluid. The magneto rheological fluid is responsive to modify its shear properties. More specifically, in responsive to a magnetic field applied to the magneto rheological fluid, the magnetorheological fluid has the ability to modify its shear property from a free-flowing or a viscous liquid to a semi-solid with controllable yield strength. It should be appreciated that other working fluids can be applicable in the fluid chamber such as but not limited to electrorheological (ER) fluids.

Figure 2:
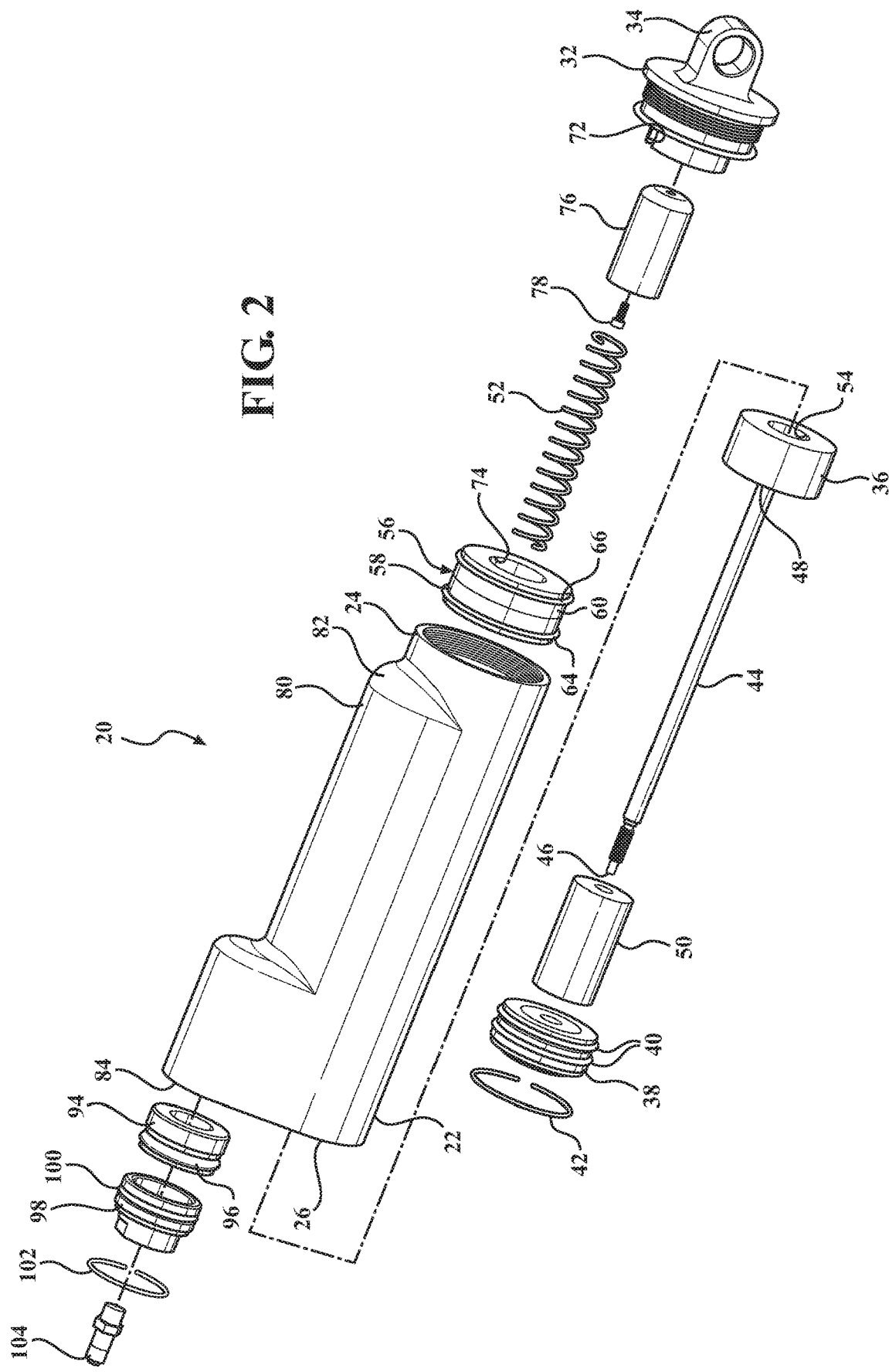
FIG. 2 is an exploded view of the magneto rheological damper.
Figure 3:
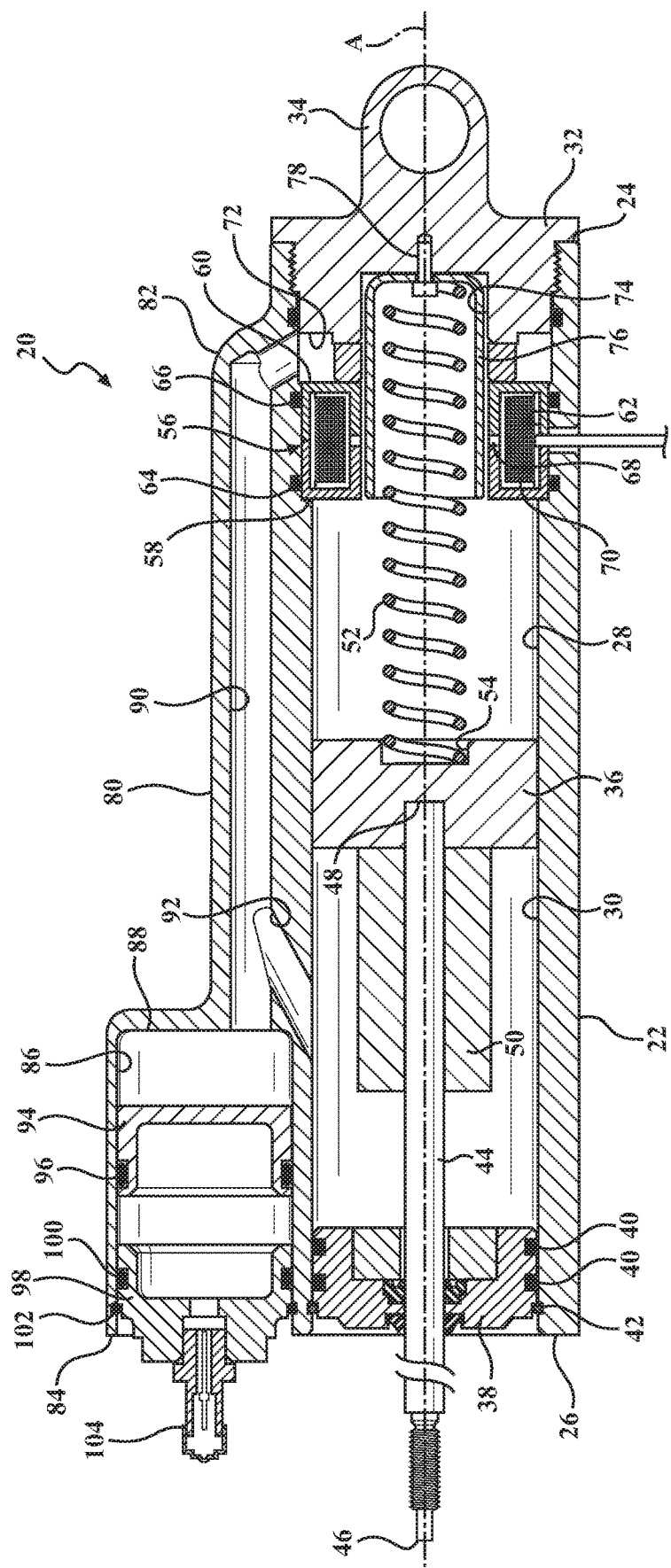
FIG. 3 is a cross-sectional side view of the magneto rheological damper constructed in accordance with an embodiment of the present invention.

As best shown in FIGS. 2 and 3, a piston 36 is slidably disposed in the fluid chamber 28, 30 dividing the fluid chamber 28, 30 into a compression chamber 28 and a rebound chamber 30. The compression chamber 28 extends between the first opened end 24 and the piston 36. The rebound chamber 30 extends between the second opened end 26 and the piston 36. A rod guide 38, having a generally cylindrical shape, is located in the rebound chamber 30 and couples to the second opened end 26 for closing the fluid chamber 28, 30. A plurality of rod guide rings 40, located on the center axis A and axially spaced from one another, extends about the rod guide 38 and in sealing engagement with the housing 22. A rod guide snap ring 42, located in the rebound chamber 30 and axially spaced from the rod guide rings 40, extends about the rod guide 38 and in an abutment relationship with the housing 22 to secure the rod guide 38 to the housing 22.

A piston rod 44 extends along the center axis A, through the rod guide 38 and into the rebound chamber 30 between a proximate end 46 and a distal end 48. The proximate end 46 is located outside of the housing 22 for connection with the mountain bike or the electric scooter. The distal end 48 couples to the piston 36 for movement with the piston 36 between a compression stroke and a rebound stroke. During the compression stroke, the piston 36 and the piston rod 44 moves along the center axis A toward the first opened end 24. During the rebound stroke, the piston 36 and the piston rod 44 moves along the center axis A toward the rod guide 38 and the second opened end 26. A rebound stop 50, having a generally tubular shape, is located in the rebound chamber 30 and extends about the center axis A in an abutment relationship with the piston 36 for providing an additional damping force during the rebound stroke. A coil spring 52 is located in the compression chamber 28, extending helically about the center axis A between the piston 36 and the end cap 32, to support rider's weight and to maintain a proper ride height. The piston 36 defines an aperture 54, having generally circular shape, located in the compression chamber 28 and extending along the center axis A for receiving one end of the coil spring 52.

As best shown in FIG. 3, a magnetic field generator 56 is located in the compression chamber 28 in an abutment relationship with the end cap 32 for generating a magnetic field to change the viscosity of the working fluid. Typically, in a magneto rheological damper that is known in the art, the magnetic field generator is incorporated into the piston. Accordingly, as the piston moves between the compression and rebound strokes, the viscosity of the working fluid changes throughout the entire length of the magneto rheological damper. In addition, to provide additional damping force a gas cup is located at one end of the magneto rheological damper. Thus, because of the aforementioned features, the length of the magneto rheological damper can be long because the changes in viscosity need to be implemented throughout the entire length of the rebound and compression strokes.

For the present invention, the magneto field generator 56 is located near the first opened end 24, i.e. in an abutment relationship with the end cap 32. This feature significantly reduces the length of the magneto rheological damper 20 thereby minimizing the packaging length of the magneto rheological damper 20. In addition, since the magnetic field generator 56 is not integral with the piston 36, i.e. the magnetic field generator 56 is a separate component, this allows for an easy assembly and maintenance of the magneto rheological damper 20. Accordingly, this also reduces the complexity of the magneto rheological damper 20 thereby reducing the cost of manufacturing the magneto rheological damper 20.

The magnetic field generator 56 has an upper portion 58 and a lower portion 60. The upper portion 58 and the lower portion 60 each has a generally U-shaped cross-section and is in an end to end relationship with one another. The upper portion 58 and the lower portion 60 collectively define a compartment 62 extending about the center axis A between the upper portion 58 and the lower portion 60. An upper portion seal 64 extends about the upper portion 58 of the magnetic field generator 56 and in sealing engagement with the housing 22. A lower portion seal 66 extends about the lower portion 60 of the magnetic field generator 56 and in sealing engagement with the housing 22. A magnetic pole ring 68 is located between the upper portion 58 and the lower portion 60 for sealing the magnetic field generator 56. A plurality of coils 70 is located in the compartment 62 extending annularly about the center axis A. It should be appreciated that the coils 70 can be electrically connected to a power source (not shown) for providing a current through the coils 70 to generate a magnetic field to change the viscosity of the working fluid.

The end cap 32 defines an orifice 72 in fluid communication with the compression chamber 28 allowing the working fluid to flow through the end cap 32 during the compression stroke and the rebound stroke. The end cap 32 and the magnetic field generator 56 define a bore 74 extending along the center axis A to receive another end of the coil spring 52. A center pole 76, having a generally tubular shape, is located in the bore 74 and secured to the end cap 32 for receiving the coiled spring 52. The center pole 76 extends annularly about the center axis A inside the bore 74, in an abutment relationship with the magnetic field generator 56, to protect the magnetic field generator 56 and the end cap 32 from any impact from the coil spring 52. In addition, the center pole 76 forms a magnetic field gap in the magnetic field generated by the magnetic field generator 56 thereby allowing the working fluid to flow through the end cap 32. A coupling member 78 extends through the center pole 76 attaching the center pole 76 to the end cap 32. According to one embodiment of the present invention, the coupling member can be a fastener, i.e. a bolt, extending through the center pole attaching the center pole 76 to the end cap 32. It should be appreciated that the center pole 76 may be attached to the end cap 32 using other methods such as, but not limited to, gluing or welding.

The housing 22 includes an extension portion 80, protruding radially outwardly from the housing 22, extending along the center axis A between a first end 82 and a second end 84. The first end 82 of the extension portion 80 is spaced from the first opened end 24 of the housing 22. The second end 84 of the extension portion 80 is located adjacent and radially spaced from the second opened end 26 of the housing 22. The extension portion 80 defines a compensation chamber 86 in fluid communication with the fluid chamber 28, 30 for containing a gas. The compensation chamber 86, located adjacent to and radially spaced from the second opened end 26, extends along the extension portion 80, parallel to the center axis, to a terminal end 88, axially spaced from the second opened end 26. The extension portion 80 defines a channel 90, radially spaced from the center axis A, extending along the extension portion 80 and in fluid communication with the compensation chamber 86 and the compression chamber 28 for allowing the working fluid to flow from the compression chamber 28 to the compensation chamber 86. The extension portion 80 defines a passage 92, disposed in fluid communication with the rebound chamber 30, for allowing the working fluid to flow from the compression chamber 28 to the rebound chamber 30.

A gas cup 94, having a generally cylindrical shape, is slidably disposed in the compensation chamber 86, spaced from the terminal end 88, for providing additional damping force. A gas cup ring 96, containing elastomeric material, extends about the gas cup 94 and in sealing engagement with the housing 22. A gas cover 98, having a generally cylindrical shape, is disposed in the compensation chamber 86 and in sealing engagement with the housing 22 to close the compensation chamber 86. Typically, in a magneto rheological damper that is known in the art, the gas cup, the compensation chamber, and the piston are disposed in a tandem relationship with one another. Accordingly, this requires the magneto rheological damper to have a longer length to accommodate for the gas cup and compensation chamber. Accordingly, to replace the gas cup, a user typically has to first remove the piston rod and the piston from the fluid chamber.

According to an embodiment of the present invention, the gas cup 94 and the compensation chamber 86 are located adjacent to the rod guide 38. With this arrangement, the length of the magneto rheological damper 20 can be significantly shortened making the magneto rheological damper 20 more compact thereby allowing the magneto rheological damper 20 to be used in smaller applications such as mountain bikes or electric scooters. In addition, this arrangement allows direct access to the gas cup 94 thereby making maintenance and replacement of the gas cup 94 easier.

A gas cover ring 100, containing elastomeric material, extends about the gas cover 98 and in sealing engagement with the housing 22. A gas cover snap ring 102 is located in the compensation chamber 86, axially spaced from the gas cup ring 96 and in an abutment relationship with the housing 22, to secure the gas cover 98 to the housing 22. A charge valve 104 couples to the gas cover 98 and extends outwardly from the gas cover 98 in a parallel relationship with the center axis A and in fluid communication with the compensation chamber 86 for allowing a user to introduce additional gas into the compensation chamber 86. It should be appreciated that the gas pressure inside the compensation chamber 86 can be changed for ride height adjustment.

In operation, during the compression stroke, the piston rod 44 and the piston 36 slides in the fluid chamber 28, 30, along the center axis A, toward the magnetic field generator 56 and the end cap 32. As the piston rod 44 and the piston 36 moves toward the end cap 32, the coil spring 52 is compressed between the piston rod 44 and the end cap 32. To provide a damping force, the magnetic field generator 56 is energized by the power source to generate a magnetic field thereby increasing the viscosity of the working fluid to provide fluid resistance to the movement of the piston rod 44 and the piston 36 during the compression stroke. In response to the piston rod 44 and the piston 36 moving toward the end cap 32, the working fluid is pushed from the compression chamber 28, through the orifice 72 of the end cap 32, the channel 90, and the passage 92, into the rebound chamber 30 and/or the compensation chamber 86. To provide an additional damping force, the gas contained in the compensation chamber 86 pushes the gas cup 94 against the flow of the working fluid. In addition, this also directs the flow of the working fluid into the rebound chamber 30. In other words, during the compression stroke, the channel 90 and the passage 92 work together as path 90, 92 for directing the flow of the working fluid from the compression chamber 28 to the rebound chamber 30.

During the rebound stroke, the compressed coil spring 52 pushes the piston rod 44 and the piston 36, along the center axis A, toward the rod guide 38. As the piston rod 44 and the piston 36 moves toward the rod guide 38, the coil spring 52 is release from its compressed state. At the same time, the piston 36 and the piston rod 44 pushes the working fluid from the rebound chamber 30, through the channel 90, the passage 92, and the orifice 72 of the end cap 32, into the compression chamber 28. To provide a damping force, the magnetic field generator 56 is energized by the power source to generate a magnetic field thereby increasing the viscosity of the working fluid to provide fluid resistance to the movement of the piston rod 44 and the piston 36 during the rebound stroke.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A magneto rheological damper comprising:
a housing extending along a center axis between a first opened end and a second opened end and defining a fluid chamber extending therebetween for containing a working fluid;
an end cap located at said first opened end and coupled to said housing for closing said first opened end;
a piston slidably disposed in said fluid chamber dividing said fluid chamber into a compression chamber and a rebound chamber with said compression chamber extending between said end cap and said piston and said rebound chamber extending between said piston and said second opened end;
a piston rod extending along said center axis into said rebound chamber between a proximate end and a distal end with said proximate end being located outside said housing and said distal end being coupled to said piston for movement between a compression stroke and a rebound stroke;
a magnetic field generator located in said compression chamber and in an abutment relationship with said end cap for generating a magnetic field to change the viscosity of the working fluid; and
an extension portion protruding radially outwardly from said housing and defining a compensation chamber and a channel with said channel being in fluid communication with said compression chamber and said compensation chamber for allowing the working fluid to flow from said compression chamber to said compensation chamber,
wherein the magneto rheological damper further includes a coil spring located in said compression chamber and extending helically along said center axis between said piston and said end cap for providing a spring force during said compression stroke,
wherein said end cap and said magnetic field generator define a bore extending along said center axis to receive one end of said coil spring,
wherein the magneto rheological damper further includes a center pole disposed in said bore, between said coil spring and said end cap and between said coil spring and said magnetic field generator, and secured to said end cap for protecting said end cap and said magnetic field generator,
wherein said center pole forms a magnetic gap to the magnetic field created by said magnetic field generator, and
wherein the magneto rheological damper further includes a coupling member extending through said center pole to said end cap attaching said center pole to said end cap.

2. The magneto rheological damper as set forth in claim 1, wherein said extension portion defines a passage, in fluid communication with said rebound chamber, for allowing the working fluid to flow from said compression chamber to said rebound chamber.

3. The magneto rheological damper as set forth in claim 2, wherein said compensation chamber is located adjacent to said second opened end of said housing for containing a gas and said passage is located adjacent to said compensation chamber.

4. The magneto rheological damper as set forth in claim 1, wherein said end cap defines an orifice in fluid communication with said compression chamber and said channel to allow the working fluid to flow through said end cap during said compression stroke.

5. The magneto rheological damper as set forth in claim 1, wherein said piston defines an aperture for receiving another one end of said coil spring.

6. The magneto rheological damper as set forth in claim 1 further including a gas cup slidably disposed in said compensation chamber for providing additional damping force.

7. The magneto rheological damper as set forth in claim 6 further including a gas cover located in said compensation chamber and in sealing engagement with said housing to close said compensation chamber; and
a charge valve coupled to said gas cover, extending outwardly from said gas cover, parallel to said center axis and in fluid communication with said compensation chamber for introducing the gas into said compensation chamber to increase gas pressure in said compensation chamber.

8. A magneto rheological damper comprising:
a housing extending along a center axis between a first opened end and a second opened end and defining a fluid chamber extending therebetween for containing a working fluid;
an end cap located at said first opened end and attached to said housing for closing said first opened end;
a piston slidably disposed in said fluid chamber dividing said fluid chamber into a compression chamber and a rebound chamber with said compression chamber extending between said end cap and said piston and said rebound chamber extending between said piston and said second opened end;
a piston rod extending along said center axis into said rebound chamber between a proximate end and a distal end with said proximate end being located outside said housing and said distal end being coupled to said piston for movement between a compression stroke and a rebound stroke;
a magnetic field generator disposed in said compression chamber and in an abutment relationship with said end cap for generating a magnetic field to change the viscosity of the working fluid;
a coil spring located in said compression chamber and extending helically along said center axis between said piston and said end cap for supporting a rider's weight and maintaining a ride height; and
said end cap and said magnetic field generator defining a bore extending along said center axis to receive one end of said coil spring,
wherein the magneto rheological damper further includes a center pole disposed in said bore, between said coil spring and said end cap and between said coil spring and said magnetic field generator, and secured to said end cap for protecting said end cap and said magnetic field generator,
wherein said center pole forms a magnetic gap to the magnetic field created by said magnetic field generator, and
wherein the magneto rheological damper further includes a coupling member extending through said center pole to said end cap attaching said center pole to said end cap.

9. The magneto rheological damper as set forth in claim 8, wherein said piston defines an aperture for receiving another one end of said coil spring.

10. The magneto rheological damper as set forth in claim 8 further including an extension portion protruding radially outwardly from said housing and defining a compensation chamber and a channel with said channel being in fluid communication with said compression chamber and said compensation chamber for allowing the working fluid to flow from said compression chamber to said compensation chamber.

11. The magneto rheological damper as set forth in claim 10, wherein said extension portion defines a passage, in fluid communication with said rebound chamber, for allowing the working fluid to flow from said compression chamber to said rebound chamber.

12. The magneto rheological damper as set forth in claim 11, wherein said compensation chamber is located adjacent to said second opened end of said housing for containing a gas and said passage is located adjacent to said compensation chamber.

13. The magneto rheological damper as set forth in claim 10, wherein said end cap defines an orifice in fluid communication with said compression chamber and said channel allowing the working fluid to flow through said end cap during said compression stroke and said rebound stroke.

14. The magneto rheological damper as set forth in claim 10 further including a gas cup slidably disposed in said compensation chamber for providing additional damping force.

15. The magneto rheological damper as set forth in claim 13 further including a gas cover located in said compensation chamber and in sealing engagement with said housing to close said compensation chamber; and a charge valve coupled to said gas cover, extending outwardly from said gas cover, parallel to said center axis and in fluid communication with said compensation chamber for introducing the gas into said compensation chamber to increase gas pressure in said compensation chamber.

* * * * *